United States Patent Office 3,067,195
Patented Dec. 4, 1962

3,067,195
16-ALKYL-3-HYDROXY - 9(11) - PREGNEN-20-ONE COMPOUNDS AND THE 3-LOWER ALKYL ESTERS THEREOF
Frank A. Cutler, Jr., Westfield, and John M. Chemerda, Metuchen, N.J., assignors to Merck & Co., Inc., Rahway, N.J., a corporation of New Jersey
No Drawing. Filed Jan. 30, 1959, Ser. No. 790,040
15 Claims. (Cl. 260—239.55)

The invention is concerned with novel steroid intermediates and with processes of preparing these intermediates. More particularly it relates to 16-alkyl-9(11)-pregnenes. It relates also to processes for preparing both 16α-alkyl and 16β-alkyl-9(11)-pregnene compounds.

Among the objects of our invention is the provision of new steroid intermediates. A more specific object is the provision of 16α-alkyl and 16β-alkyl-9(11)-pregnenes useful as intermediates for the preparation of anti-inflammatory steroids and processes for the preparation of such intermediates. Other objects of the invention will be apparent from the detailed description which follows.

In accordance with the present invention it has now been found that 3,17α-dihydroxy-16-alkyl-9(11)-pregnen-20-one may be prepared as indicated in the following reaction sequence:

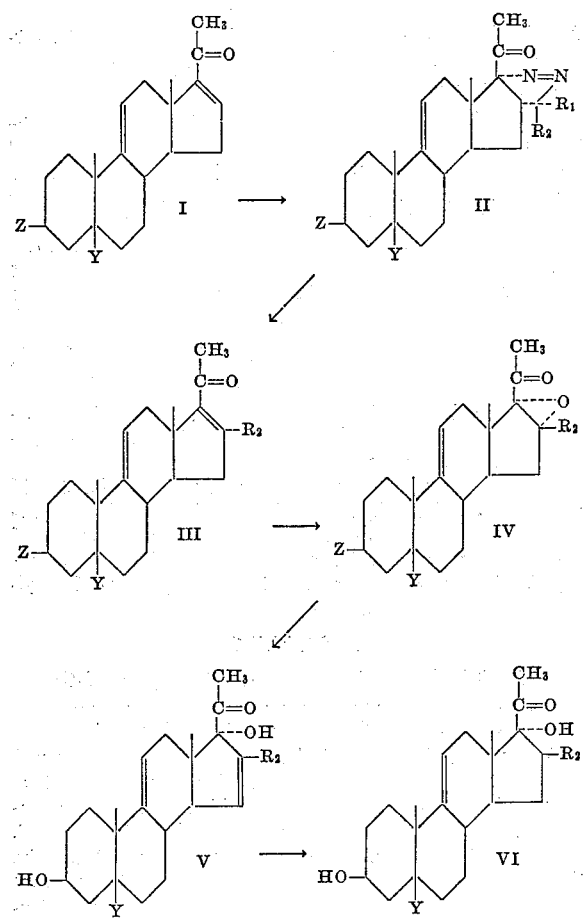

wherein Z is hydroxy or acyloxy, and Y is α or β hydrogen, $R_1$ is hydrogen or lower alkyl and $R_2$ is alkyl.

In accordance with a preferred embodiment of our invention 3-acetoxy-9(11),16-pregnadien-20-one which is represented by formula I hereinabove is utilized as the starting material. However, it is clear to those skilled in the art that other starting materials included within the scope of the formula above, may be similarly converted to the desired end product.

It has now been found that 3-acyloxy-9(11),16-pregnadien-20-one may be caused to react with a diazoalkane such as diazomethane or diazoethane to form 3-acyloxy-16α,17β-alkylenazo-9(11)-pregnen-20-one (II). A preferred method of effecting this transformation is to form the diazoalkane in situ, whereby steroid reactant is present in the solution as the diazoalkane is formed. This is particularly desirable because of the fact that diazomethane is known to be a highly explosive compound and this reduces the danger of having a large excess of the dangerous material present at any particular time.

On heating 3-acyloxy-16α,17α-alkyleneazo-9(11)-pregnen-20-one, there is formed primarily 3-acyloxy-16-alkyl-9(11),16-pregnadien-20-one which is illustrated by formula (III) in the reaction flow sheet outlined above, which may be converted to the corresponding 3-hydroxy compound by hydrolysis with an alkali.

Oxidation of 3-hydroxy-16-alkyl-9(11),16-pregnadien-20-one, the major product obtained above, with an oxidizing agent such as hydrogen peroxide in an alkaline medium, such as methanolic sodium hydroxide results in the formation of 3-hydroxy-16α,17α-epoxy-16-alkyl-9(11)-pregnen-20-one which is indicated in the flow sheet above as formula IV. Although the oxidation reaction is carried out in this preferred embodiment using the 3-hydroxy steroid as the reactant it is also possible to use an ester of the 3-hydroxy steroid group. However, when an ester is used as a starting material in this reaction step, it is ordinarily hydrolyzed to the 3-hydroxy compound. Therefore, as a method of convenience the 3-acyloxy compound is first hydrolyzed to the 3-hydroxy compound before carrying out the oxidation reaction.

Upon treatment of compound IV, 3-hydroxy-16α,17α-epoxy-16-alkyl-9(11)-pregnen-20-one, with a strong acid such as perchloric acid there is formed an olefin mixture of 3,17α-dihydroxy - 16 - alkyl-9(11),15-pregnadien-20-one and 3,17α-dihydroxy - 16 - alkylene-9(11)-pregnen-20-one which are indicated as compound V in the reaction sequence above. Although perchloric acid is used as the acid of choice, other acids such as sulphuric, p-toulenesulphonic, hydrochloric and trifluoroacetic may also be advantageously employed here.

Hydrogenation of the mixture of products indicated by Formula V above with hydrogen in the presence of a hydrogenation catalyst such as palladium-on-charcoal results in the formation of a mixture of the 3,17α-dihydroxy-16α-alkyl-9(11)-pregnen-20-one and 3,17α-dihydroxy-16β-alkyl-9(11)-pregnen-20-one which are included in the scope indicated by Formula VI in the reaction sequence above.

In an alternate method of preparation, the 3-hydroxy-16α,17α-oxido-16-alkyl-9(11)-pregnen-20-one is hydrogenated under acidic conditions to produce directly a mixture of 3,17α-dihydroxy-16α-alkyl-9(11)-pregnen-20-one and 3,17α-dihydroxy-16β-alkyl-9(11)-pregnen-20-one. At this stage the epimeric mixture of materials is separated into its components by chromatography or fractional crystallization methods.

The following examples are introduced to be illustrative of the invention claimed and the invention is not necessarily limited thereto:

EXAMPLE 1

*3α-Acetoxy-16α,17α-Methyleneazo-9(11)-Pregnen-20-One*

A mixture was prepared of 96.1 g. of 3α-acetoxy-9(11)-16-pregnadien-20-one, 2000 ml. of dimethylformamide and 50 g. (dry weight) of N,N'-dimethyl-N,N'-dinitrosoterephthalamide, cooled externally to 2–3° C. and a solution previously prepared of 30 ml. 50% aqueous methylamine in 250 ml. dimethylformamide was added slowly, while maintaining the temperature of the reaction mixture below 10° C. (about 12 mins. required). The mixture was maintained at 3–5° C. for about 3½ hrs., and the excess diazomethane generated was destroyed by slowly adding a solution of 20 ml. glacial acetic acid in 1 l. of water while maintaining the temperature of the reaction mixture below 10° C. The resulting slurry was poured into approximately 4 liters of a mixture of ice and water. After a period of about 1 hr. the precipitate which formed was collected by filtration and washed with a large volume of cold water to remove the dimethylformamide. The precipitate was leached on the filter with 3 portions of 300 ml. methylene chloride to extract the product. The methylene chloride extract of product was evaporated in vacuo to a low volume. The product was crystallized by the addition of approximately 1 liter of petroleum ether and the resulting suspension of crystals was chilled and recovered by filtration. After washing with cold petroleum ether, and drying, the product 3α-acetoxy-16α,17α-methyleneazo-9(11)-pregnen-20-one melted at 156–161° C. dec. Recrystallization from methylene chloride petroleum ether gave product melting at 150–163° dec.

Similarly, using other esters of 3-hydroxy-9(11), 16-pregnadien-20-one as starting materials i.e. the 3-propionate, the 3-butyrate or the 3-benzoate and employing the procedure described above, the reaction proceeds similarly to give the corresponding ester e.g. the 3-propionate, the 3-butyrate or the 3-benzoate of the desired 16α,17α-methylenazo compound.

The reaction is also carried out using diazoethane in place of diazomethane and the product obtained when the steroid starting material is 3-acetoxy-9(11),16-pregnadien-20-one is the corresponding 3-acetoxy-16α,17α-ethylideneazo-9(11)-pregnen-20-one.

EXAMPLE 2

*3α-Acetoxy-16-Methyl-9(11)-16-Pregnadien-20-One*

A mixture was prepared of 89.1 g. of 3-acetoxy-16α,16α-methyleneazo-9(11)-pregnen-20-one, and 180 ml. of ethylene glycol. The mixture was heated without stirring until the internal temperature rose to about 160° C., at which period evolution of nitrogen began. The heating was continued until all of the nitrogen gas was apparently expelled and finally the reaction mixture was maintained at about 175° C. for approximately 20–25 min. The clear solution containing the product 3-acetoxy-16-methyl-9(11),16-pregnadien-20-one was then cooled to 95° C. and approximately 902 ml. of methanol and 141 ml. of 4.5 N sodium hydroxide were added to hydrolyze the 3-acetate to the 3-hydroxy compound. The solution was heated to its temperature of reflux for approximately 45 min., then cooled to approximately 25° C. and neutralized with dilute hydrochloric acid. The resulting suspension, containing 3α-hydroxy-16-methyl-9(11),16 pregnadien-20-one was evaporated under reduced pressure to a volume of about 800 ml.; 180 ml. of water was added and the suspension was cooled to 0–5° C. to promote further crystallization of product. The crude product was removed by filtration, washed with water and dried. Recrystallization from acetonitrile gave product melting at 159–166° C.;

$\lambda_{max.}^{MeOh}$ 252 mu, A% 248.

Instead of the 3-acetate, the 3-propionate, the 3-butyrate, and the 3-benzoate are treated according to the above procedure to produce the corresponding 3 esters of 3-hydroxy-16-methyl-9(11),16-pregnadien-20-one.

When 3-acetoxy-16α,17α-ethyleneazo-9(11)-pregnen-20-one is used as the steroid starting material and treated according to the process described above the resulting material obtained is 3-acetoxy-16-ethyl-9(11),16-pregnadien-20-one which is hydrolyzed with methanolic sodium hydroxide to produce 3-hydroxy-16-ethyl-9(11),16-pregnadien-20-one.

EXAMPLE 3

*3α-Hydroxy-16α,17α-Oxido-16β-Methyl-9(11)-Pregnen-20-One*

A mixture was prepared of approximately 27.4 g. of 3α-hydroxy-16-methyl-9(11),16-pregnadien-20-one in 274 ml. of methanol and to the mixture a solution of 27.4 ml. of 10 N aqueous sodium hydroxide was added. During this period the steroid reactant separated from the solution as a fine suspension. At this point 27 ml. of 30% aqueous hydrogen peroxide was added to the reaction mixture with external cooling to keep the reaction mixture at about 25° C. When the addition of hydrogen peroxide was complete the reaction mixture was stirred at room temperature for about 2 hours. A second 27 ml. portion of 30% aqueous hydrogen peroxide was then added and the resulting mixture was stirred for approximately 22 hrs. at 25° C. The entire reaction mixture was then chilled to effect complete precipitation of the oxido steroid, the product was recovered by filtration and washed with water directly on the filter, then dried. Purification was effected by crystallization from isopropyl alcohol. It melted at 199.4–201.2° C.; [α] 20.5°+33.3 (chf.).

Similarly, when 3-hydroxy-16-ethyl-9(11),16-pregnadien-20-one is treated according to the procedure above the product obtained after filtration and crystallization is 3-hydroxy-16α,17α-oxido-16-ethyl-9(11)pregnen-20-one.

EXAMPLE 4

*3α,17α-Dihydroxy - 16 - Methyl-9(11),15-Pregnadien-20-One and 3α,17α-Dihydroxy - 16 - Methylene - 9(11)-Pregnen-20-One*

A solution is prepared of 15 g. of 3-hydroxy-16,17-oxido-16β-methyl-pregnen-20-one, 450 ml. of dioxane and 225 ml. of aqueous perchloric acid (containing 45 ml. of 70% perchloric acid). The solution was stirred for approximately 22 hrs. at 25° C. under an atmosphere of nitrogen. To the solution was then slowly added 6750 ml. of water. The resulting suspension of product was maintained at 3° C. for about 1 hr. to promote further crystallization, then recovered by filtration, washed with water and dried. Recrystallization from acetonitrile gives product melting at 177.4–180.6° C. Nuclear magnetic resonance absorption analysis indicated the crystalline product to be a mixture of 3,17-dihydroxy-16-methyl-9(11),15-pregnadien-20-one and 3,17-dihydroxy - 16 - methylene-9(11)-pregnen-20-one.

Following the same procedure, and using as the steroid starting material 3-hydroxy-16,17-oxido-16β-ethyl-9(11)-pregnen-20-one the product obtained after recovery and crystallization is a mixture of 3,17-dihydroxy-16-ethyl-9(11),15-pregnadien-20-one and 3,17-dihydroxy-16-ethylidene-9(11)-pregnen-20-one.

EXAMPLE 5

*3,17α-Dihydroxy-16α-Methyl-9(11)-Pregnen-20-One*

PART A.—HYDROGENATION OF DIENE MIXTURE OBTAINED ACCORDING TO EXAMPLE 4

Approximately 1 g. of the steroid mixture obtained according to Example 4, 50 ml. of methanol and 1 g. 10% palladium-on-charcoal was added to a hydrogenation vessel and the hydrogenation conducted at 25° C. for about 30 min. at atmospheric pressure. After the throretical amount of hydrogen was absorbed the catalyst was removed by filtration, the filtrate evaporated to dryness, and the partially crystalline product thus obtained was purified by chromatography on Fluorosil (100 g.) and eluted with a mixture of solvents. The desired product was obtained from the eluate fractions having a solvent composition of 10% acetone and 90% hexane. After removal of the solvent by evaporation the product recovered after recrystallization was 3,17α-dihydroxy- 16α-methyl-9(11)-pregnen-20-one, melting point 181.6–184° C.

From eluate fractions having a solvent composition of

20% acetone
80% hexane which occurred later in the chromatography, product was obtained which was identified as 3,17α-dihydroxy-16β-methyl-9(11)-pregnen-20-one, melting point 171–176° C.

Employing essentially the same hydrogenation procedure and using a mixture of 3,17α-dihydroxy-16-ethyl-9(11),15-pregnadien-20-one and 3,17α-dihydroxy - 16 ethylidene-9(11)-pregnen-20-one, the products obtained after hydrogenation, chromatography, and crystallization are 3,17α-dihydroxy-16α-ethyl-9(11)-pregnen-20-one and 3,17α-dihydroxy-16β-ethyl-9(11)-pregnen-20-one.

The 3-hydroxy compounds obtained according to the above procedures are conveniently acylated to the corresponding 3 ester by treatment of the steroid compound with an anhydride of an aliphatic acid in pyridine e.g. the 3-acetate, the 3-propionate, the 3-butyrate, and the 3-benzoate.

PART B.—HYDROGENATION IN AN ACIDIC MEDIUM

When the hydrogenation of Part A is repeated with the addition of 1 ml. of 70% of perchloric acid the major product obtained was 16α-methyl - 3α,17α - dihydroxy - 9(11)-pregnen-20-one.

PART C.—HYDROGENATION OF 3-HYDROXY-16,17-OXIDO-16-METHYL-9(11)-PREGNEN-20-ONE IN AN ACIDIC MEDIUM

Using approximately 1 g. of 3-hydroxy-16α,17α-oxido-16β-methyl-9(11)-pregnen-20-one as starting material and carrying out the hydrogenation procedure described in Part B of the example, the product obtained after recrystallization from benzene in excellent yield is 3,17α-dihydroxy-16α-methyl-9(11)-pregnen - 20 - one, melting point 178–180° C.

The starting materials used in the process of our invention i.e. a 3-hydroxy or acyloxy-9(11),16-pregnadien-20-one are conveniently prepared from the known 3α,11β-dihydroxy pregnen-20-one or 3-acylate thereof according to the following procedures: a 3,11β-dihydroxy-20-one or 3 ester thereof is brominated in the presence of a strong acid catalyst to obtain a 3-hydroxy-17,21-dibromo-9(11)-pregnen-20-one or a 3 ester thereof; the thus obtained 3-hydroxy-17,21-dibromo-9(11)-pregnen-20-one or 3 ester thereof is contacted with an alkali metal iodide at an elevated temperature to form the corresponding 3-oxygenated 9(11),16-pregnadien-20-one. These procedures are described in greater detail in application S. N. 748,178 of the present inventors, filed July 14, 1958, now Patent No. 3,013,031.

The 3,17α-dihydroxy-16-alkyl-9(11)-pregnen - 20 - one compounds and the 3-esters thereof are useful as intermediates in the preparation of highly active antiinflammatory steroids as for example, 9α-fluoro- 16α-methyl-11β,17α,21-trihydroxy-1,4-pregnadiene-3,20 - dione. Conversion of the presently claimed intermediates to the known steroid is effected by the following procedure: 3.17α-dihydroxy-16α-methyl-9(11)- pregnen-20-one is reacted with bromine in chloroform to form 21-bromo-16α-methyl-3,17α-dihydroxy-9(11)-pregnen-20-one which is reacted with sodium iodide in acetone to produce 21-iodo-16α-methyl-3,17α-dihydroxy-9(11)pregnen-20-one which is converted without isolation to 3,17α-dihydroxy-16α-methyl-21-acetoxy-9(11)-pregnen-20-one by reaction with anhydrous potassium acetate; the latter compound is reacted with chromium trioxide in pyridine to form 21-acetoxy-17α-hydroxy-16α-methyl-9(11)-pregnene-3,20 - dione which is converted to 17α,21-dihydroxy-16α-methyl - 1,4,9(11)-pregnatriene-3,20-dione by contacting it with the dehydrogenating activity of microorganisms identified as Nocardia asteroides (AtCC 9970); the latter compound is then reacted with acetic anhydride in the presence of pyridine to produce the corresponding 21-acetoxy-17α-hydroxy-16α-methyl-1,4,9(11) - pregnatriene - 3,20 - dione which is then reacted with hypobromous acid to produce 9α-bromo-21-acetoxy-11β,17α-dihydroxy - 16α - methyl - 1,4,-pregnadiene-3,20-dione which in turn is reacted with anhydrous potassium acetate in ethanol to produce 21-acetoxy-9,11-epoxy-17α-hydroxy-16α-methyl-1,4 - pregnadiene-3,20-dione. This 9,11-epoxide is then reacted with hydrogen fluoride in tetrahydrofuran to produce 21-acetoxy-11β,17α-dihydroxy-9α-fluoro-16α - methyl - 1,4 - pregnadiene-3,20-dione. This compound is reacted with a hydrolyzing agent to form 11β,17α,21-trihydroxy-9α-fluoro-16α-methyl-1,4-pregnadiene-3,20-dione.

Various changes and modifications may be made in carrying out the present invention without departing from the spirit and scope thereof. Insofar as these changes and modifications are included within the purview of the dependent claims they are to be considered as part of our invention.

We claim:

1. 16β-alkyl-16α,17α-epoxy-3α-hydroxy - 9(11) - pregnen-20-one.
2. 3α-lower hydrocarbon acyloxy-16β-alkyl - 16α,17α-epoxy-9(11)-pregnen-20-one.
3. 16-alkyl-3α,17α-dihydroxy-9(11),15-pregnadien - 20-one.
4. 16-alkyl-3α-lower hydrocarbon acyloxy - 17α - hydroxy-9(11),15-pregnadien-20-one.
5. 16-alkylene-3α,17α-dihydroxy-9(11) - pregnen - 20-one.
6. 16-alkylene-3α-lower hydrocarbon acyloxy-17α-hydroxy-9(11)-pregnen-20-one.
7. The process which comprises reacting 3α-lower hydrocarbon acyloxy-16-alkyl-9(11),16-pregnadien-20 - one with hydrogen peroxide to form 16β-alkyl-16α,17α-epoxy-3α-hydroxy-9(11)-pregnen-20-one.
8. The process which comprises isomerizing 16β-alkyl-16α,17α-epoxy-3α-hydroxy-9(11)-pregnen - 20 - one with acid to form a mixture of 16-alkyl-3α,17α-dihydroxy-9(11),15-pregnadien-20-one and 16-alkylene-3α,17α-dihydroxy-9(11)-pregnen-20-one.
9. The process which comprises hydrogenating under acidic conditions 6β-alkyl-16α,17α - epoxy-3α - hydroxy-9(11)-pregnen-20-one to form a mixture of 16α-alkyl-3α,17α-dihydroxy-9(11)-pregnen-20-one and 16β-alkyl - 3α,17α-dihydroxy-9(11)-pregnen-20-one.
10. The process which comprises reacting 3α-hydroxy-16-alkyl-9(11),16-pregnadien-20-one with hydrogen peroxide to form 16β-alkyl-16α,17α-epoxy-3α-hydroxy-9(11)-pregnen-20-one.
11. The process which comprises hydrogenating a mixture of 16-alkyl-3α,17α-dihydroxy-9(11),15-pregnadien-20-one and 16-alkylene-3α,17α-dihydroxy-9(11)-pregnen-20-one to form a mixture of 3α,17α-dihydroxy-16β-alkyl-9(11)-pregnen-20-one and 3α,17α-dihydroxy-16α - alkyl-9(11)-pregnen-20-one.
12. The process which comprises reacting 3α-acetoxy-16-methyl-9(11),16-pregnadien-20-one with hydrogen peroxide to form 16β-methyl-16α,17α-epoxy-3α-hydroxy-9(11)-pregnen-20-one.
13. The process which comprises isomerizing 16β-methyl-16α,17α-epoxy-3α-hydroxy-9(11)-pregnen-20 - one with acid to form a mixture of 16-methyl-3α,17α-dihydroxy-9(11),15-pregnadien-20-one and 16-methylene-3α,17α-dihydroxy-9(11)-pregnen-20-one.
14. The process which comprises hydrogenating under acidic conditions 16β-methyl-16α,17α-epoxy-3α-hydroxy-9(11)-pregnen-20-one to form a mixture of 16α-methyl-3α,17α-dihydroxy-9(11)-pregnen-20-one and 16β-methyl-3α,17α-dihydroxy-9(11)-pregnen-20-one.
15. The process which comprises hydrogenating a mixture of 16-methyl-3α,17α-dihydroxy-9(11),15-pregnadien-20-one and 16-methylene-3α,17α-dihydroxy-9(11)-pregnen-20-one to form a mixture of 3α,17α-dihydroxy-16β-methyl-9(11)-pregnen-20-one and 3α,17α-dihydroxy-16α-methyl-9(11)-pregnen-20-one.

References Cited in the file of this patent

UNITED STATES PATENTS

| | | |
|---|---|---|
| 2,596,563 | Kaufmann et al | May 13, 1952 |
| 2,648,662 | Julian et al. | Aug. 11, 1953 |
| 2,759,929 | Farrar et al. | Aug. 21, 1956 |

FOREIGN PATENTS

| | | |
|---|---|---|
| 551,726 | Belgium | Oct. 12, 1956 |

OTHER REFERENCES

Wettstein: Helv. Chim. Acta., vol. 27 (1944), pp. 1803–1814.

Djerassi et al.: J. Org. Chem., vol. 14 (1949), pp. 660–663.

Rosenkranz et al.: J. Am. Chem. Soc., vol. 72 (September 1950), pp. 4081–85.

Djerassi et al.: J. Org. Chem., vol. 16 (1951), pp. 1278–82.

Archives of Biochemistry and Biophysics vol. 74 No. 1, Mar., 1958, p. 280.

Arth et al.: J. Am. Chem. Soc., vol. 80 (June 20, 1958), pp. 3160–61.

Arth et al.: J. Am. Chem. Soc., vol. 80 (June 20, 1958), pp. 3161–63.